Dec. 23, 1930.  E. G. KESLING  1,785,776
SPEED CHANGING MECHANISM
Filed Sept. 27, 1928   2 Sheets-Sheet 1
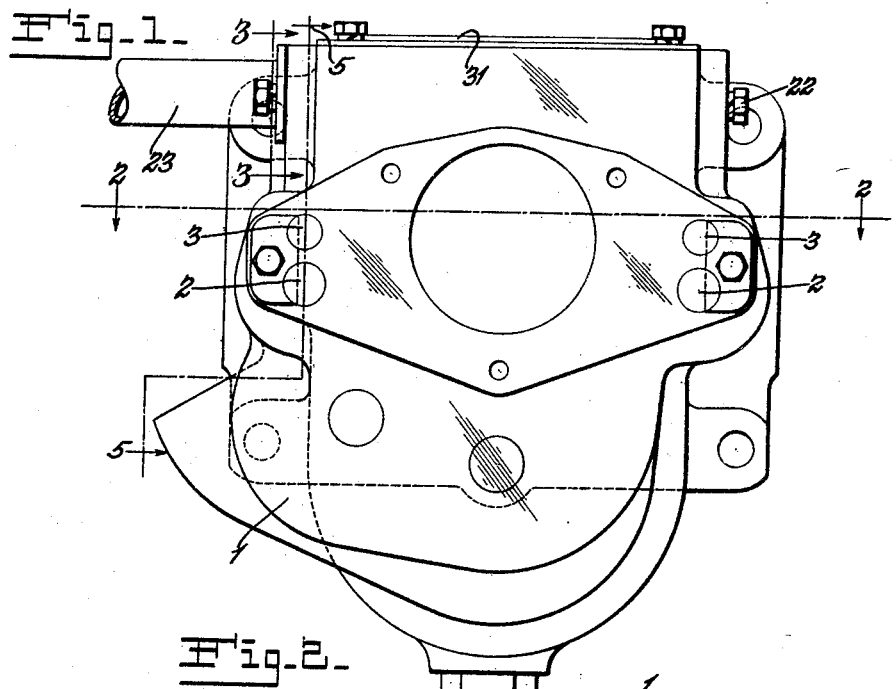
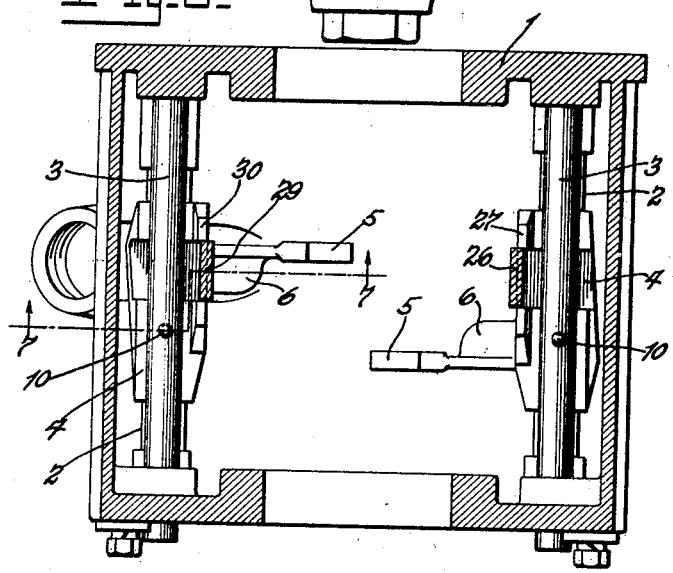
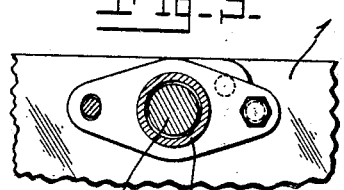
Inventor:
Elmer G. Kesling,
by Rippey & Kingsland.
His Attorneys.

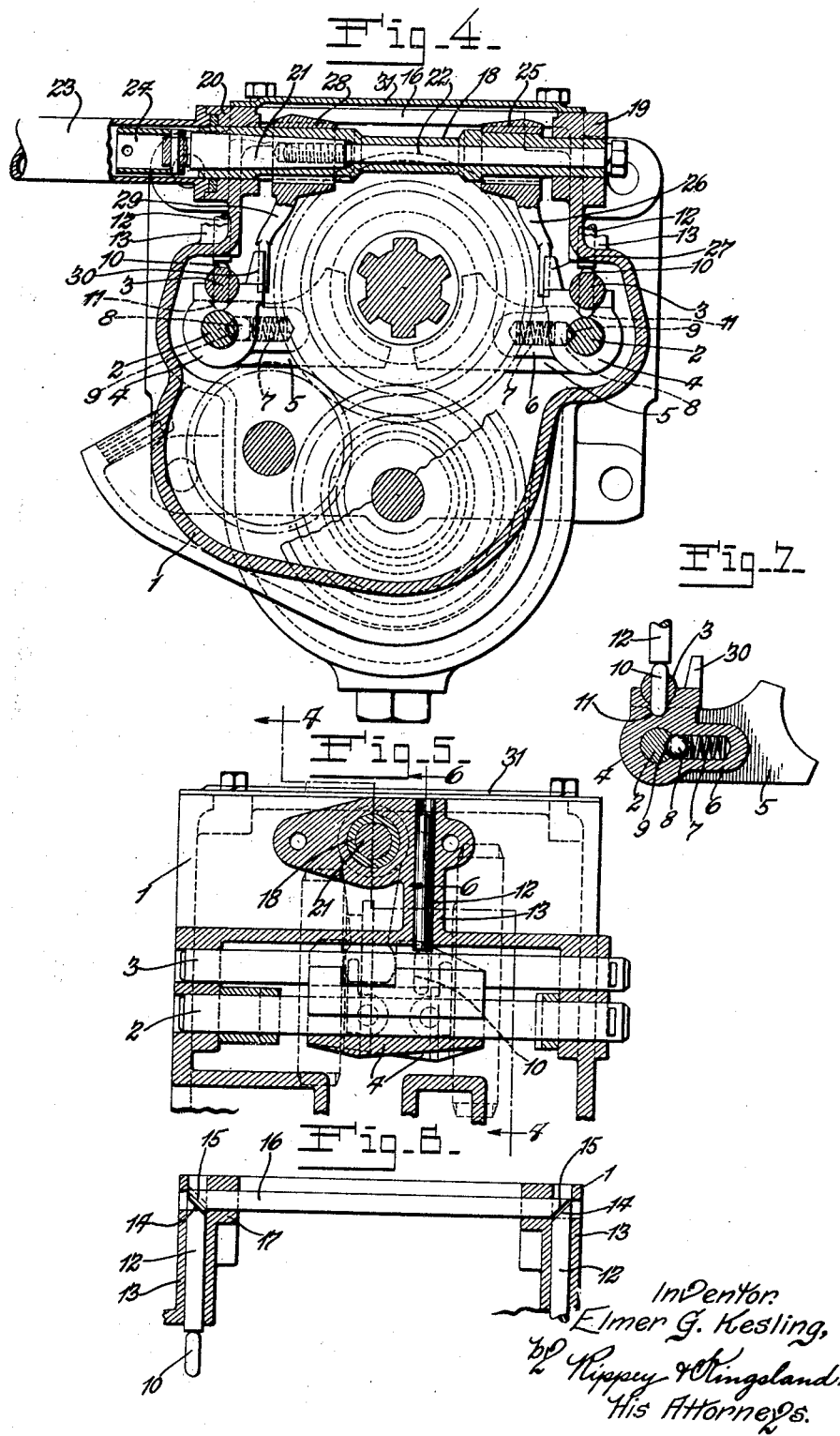

Patented Dec. 23, 1930

1,785,776

UNITED STATES PATENT OFFICE

ELMER G. KESLING, OF BLOOMFIELD, MISSOURI

SPEED-CHANGING MECHANISM

Application filed September 27, 1928. Serial No. 308,702.

This invention relates to speed changing mechanism for use in automobiles and has special reference to the devices directly associated with the gear case.

One object of the invention is to provide an improved speed changing mechanism comprising laterally movable gear shifting arms of the transmission device, in combination with actuators for shifting said arms laterally, and a supporting spindle of novel construction for supporting and operating said actuators.

Another object of the invention is to provide improved means for preventing simultaneous operation of said arm by said actuators so that it is necessary to disconnect one of said actuators from the corresponding gear shifting arms before the other actuator can be operated, and vice versa.

Another object of the invention is to provide an improved spindle mounted in the gear case for rocking and longitudinal movements and for supporting and operating parts of the gear shifting devices.

Another object of the invention is to provide an improved speed changing mechanism possessing all of the improved features of construction and capable of obtaining all of the advantages herein described or made apparent from the following description, reference being made to the drawings in which Fig. 1 is an end elevation of a gear case in which my invention is embodied.

Fig. 2 is a cross sectional view on the line 2—2 of Fig. 1.

Fig. 3 is a sectional view on the line 3—3 of Fig. 1.

Fig. 4 is a vertical sectional view approximately on the line 4—4 of Fig. 5.

Fig. 5 is a sectional view approximately on the line 5—5 of Fig. 1.

Fig. 6 is a sectional view on the line 6—6 of Fig. 5.

Fig. 7 is a detail sectional view taken approximately on the line 7—7 of Fig. 2, showing the means for latching the gear shifting arms in their starting positions and for preventing simultaneous shifting of said gears.

The mechanism shown comprises a transmission gear case 1 having a number of parallel rods 2 supported therein below and parallel with corresponding rods 3 likewise supported in the gear case 1. On each of the rods 2 a hub 4 is mounted for sliding movements and from each of said hubs 4 a gear shifting arm 5 projects. These gear shifting arms 5 are operatively connected with speed changing gears in some suitable manner so that when a unit 4—5 is shifted laterally on its supporting rod 2 the corresponding speed changing gear will be shifted.

The present invention is not concerned with the manner of connection of the arms 5 with the gears so that such construction is not shown and described in detail. Each arm 5 is formed with a spring pocket 6 enclosing a spring 7, the energy of which is exerted to actuate a ball 8 to seat in spaced notches or recesses 9 in the associated rod 2 so as to latch the unit 4—5 in its neutral and shifted position. Each hub 4 is notched in its upper side to receive the lower edge of the corresponding rod 3, whereby said unit 4—5 is supported in proper assembly and is held from turning from proper adjustment but is capable of longitudinal sliding movements along the rod 2. Each of the rods 3 has a pin 10 mounted therein for vertical sliding movements and provided with rounded ends. The length of each pin 10 is greater than the diameter of the rod 3 in which it is mounted and in the normal or starting position of the corresponding hub 4 the lower end of the pin 10 seats in a cavity 11 in said hub 4 so that it is necessary for the hub 4 to raise the corresponding pin 10 before the hub can be moved longitudinally in either direction.

Pins 12 are mounted for vertical sliding movements in guides 13 in connection with the gear case 1 and have their lower ends seated upon the respective pins 10. The upper ends of the pins 12 are formed with inclined end walls 14 which are opposite correspondingly shaped end walls 15 of the laterally movable rod 16 mounted for sliding movements in guides 17 in connection with the case 1. The construction and relationship of these parts is such that it is impossible to shift both hubs 4 at the same time, but to permit said hubs to be shifted selectively. When either hub 4 is shifted it raises the corresponding pins 10 and 12, causing the inclined wall 14 on the pin 12 to engage with the inclined wall 15 on the pin 16 and shift the pin 16 toward the opposite pin 12 a sufficient distance to constitute an abutment to prevent the opposite pins 12 and 10 from being raised. Thus, the hub 4 opposite from one that has been shifted is locked.

A tubular element 18 is mounted for rocking and longitudinal movements in bearings 19 and 20 in connection with the gear case 1. A tapered member 21 is mounted in a correspondingly tapered hole in one end of the tubular element 18. A bolt 22 projects into the opposite end of the tubular element 18 and screws into a threaded hole in the inner end of the tapered member 21 and thereby holds said parts in clamped connection. The outer end of the tapered member 21 projects into a tube 23 constituting a support and guide for an operating device 24 which is connected with the outer end of the tapered member 21. The end of the tube 23 is attached to the gear case 1 and the operating device 24 constitutes means for imparting rocking and longitudinal movements to the unit which is herein termed spindle and comprising the parts 18, 21 and 22.

A hub 25 is attached to the tubular member 18 adjacent to the bearing 19 and has a depending arm 26 movable from and to position between spaced arms 27 on one of the hubs 4, such movement of the arm 26 being effected by moving the supporting spindle longitudinally.

A hub 28 is attached to the tubular member 18 adjacent to the bearing 20 and has a depending arm 29 movable from and to position between spaced arms 30 on the corresponding hub 4, such movement of the arm 29 being effected by moving the supporting spindle longitudinally. When the spindle is moved in a direction and to an extent to engage the arm 26 wholly between the arms 27 the arm 29 is thereby moved from between the arms 30 so that when the spindle is rocked the arm 26 may be oscillated to shift the corresponding hub 4 and thereby its gear shifting arm 5. This operation causes the shifted hub 4 to raise the corresponding pins 10 and 12 to position to cause the rod 16 to lock the opposite rods 10 and 12 and thereby the opposite hub 4. When the spindle is moved in the opposite direction to an extent to engage the arm 29 wholly between the arms 30 the arm 26 is thereby moved from between the arms 27 with the result that when the spindle is turned the hub 4 that is connected with the arm 29 will be shifted laterally, raising the corresponding pins 10 and 12 and causing the pin 16 to lock the opposite pins 10 and 12 and thereby the opposite hub 4. In normal or neutral position both of the arms 26 and 29 are partly in engagement with the respective arms 27 and 30 and it is thereby impossible to rock the spindle in either direction.

The upper end of the gear case is provided with a removable cover plate 31 which need not be removed in order to remove the parts 21 and 22 of the spindle. Thus, likelihood of foreign objects being left in the gear case when these parts are disconnected and detached is reduced to a minimum.

From the foregoing it will be seen that my invention obtains all of its intended objects and purposes in a very efficient and satisfactory manner. Obviously, the construction, arrangement and relationship of the parts may be varied within equivalent limits without departure from the nature and principle of the invention. I contemplate such variations as may be found desirable and do not restrict myself in these or unessential particulars, but what I claim and desire to secure by Letters Patent is:

1. In speed changing mechanism, a gear case, gear shifting devices, a tubular element supporting parts of said devices, a shaft for imparting rocking and longitudinal movements to said tubular element, and a clamping device connected to said shaft and having rotative adjustable connection with said tubular element securing said shaft in rigid connection with said tubular element.

2. In speed changing mechanism, a gear case, gear shifting devices, a tubular element supporting parts of said devices, a shaft for imparting rocking and longitudinal movements to said tubular element, and a clamping device connected with said shaft and having rotative adjustable connection with said tubular element securing said shaft in rigid connection with said tubular element and being releasable to permit detachment of said shaft from said tubular element while said element remains in connection with said case.

3. In speed changing mechanism, a transmission gear case, bearings in connection with said case, a tubular element mounted in said bearings for rocking and longitudinal movements, a shaft for imparting rocking and longitudinal movements to said tubular element, a connection for said shaft at one end of said tubular element, and a part passing through said tubular element engaging and holding said connection in engagement with said tubular element.

4. In speed changing mechanism, a transmission gear case, spaced bearings supported by the walls of said case, a tubular element mounted for rocking and longitudinal movements in said bearings, a connecting member in one end of said tubular element, a bolt passing through the opposite end of said element and engaging said connecting member, an operating shaft in connection with said connecting member for imparting rocking and longitudinal movements thereto and thereby to said tubular member, and arms supported by said tubular elements.

5. In speed changing mechanism, a rod, a hub mounted for sliding movements along said rod, an additional rod engaging and preventing said hub from turning, a spindle mounted for rocking movements, means for rocking said spindle, and an arm supported by said spindle and engaging said hub.

6. The combination with a transmission gear case, and gear shifting devices supported in said case, of a spindle for operating said gear shifting devices comprising a tubular member mounted for rocking and longitudinal movements in said case, a shaft for imparting rocking and longitudinal movements to said member, a connecting element for said shaft extending into said tubular member, and a fastener for holding said connecting element in rigid relationship to said tubular member.

7. In speed changing mechanism, the combination of a gear case, gear shifting elements mounted in said case, bearings in connection with said case, a tubular member mounted for rocking and longitudinal movements in said bearings, a shaft for imparting rocking and longitudinal movements to said tubular member, a connecting device for said shaft extending into said tubular member, and an element extending into the opposite end of said tubular member engaging and holding said connecting device.

8. In speed changing mechanism, a transmission gear case, a pair of parallel rods supported in said case, a gear shifting arm supported for sliding movements on one of said rods, means whereby the other one of said rods prevents said arm from turning on the rod on which it is mounted, a sliding pin in connection with said second rod engaging said arm, a third rod, and an element controlled by said third rod for causing said pin to prevent movement of said arm under predetermined conditions.

9. In speed changing mechanism, a gear case, two pairs of parallel rods mounted in said case, a gear shifting arm supported by one rod of each pair of rods, means whereby the other rod of each pair of rods will prevent the corresponding gear shifting arm from turning on the rod on which it is mounted, and a device in connection with each of said other rods for preventing simultaneous shifting of said gear shifting arms.

10. Speed changing mechanism comprising a gear case, two pairs of parallel rods supported in said case, a gear shifting arm supported by one rod of each pair of rods, an element in connection with the other rod of each pair of rods for preventing simultaneous shifting of said gear shifting arms, and means for controlling said element to permit shifting of either one of said arms and prevent shifting of the other arm selectively, as desired.

11. Speed changing mechanism comprising a gear case, two pairs of parallel rods supported in said case, a gear shifting arm supported by one rod of each pair of rods, elements in connection with the other rod of each pair of rods preventing simultaneous shifting of said gear shifting arms, a spindle supported for rocking and longitudinal movements in said case, arms supported by said spindle for engagement with said gear shifting arms respectively, and means for operating said spindle to operate said gear shifting arms selectively.

12. A speed changing mechanism, a pair of rods, a plurality of gear shifting yokes mounted for sliding movements along said rods, elements engaging and holding said yokes from turning on said rods, a spindle mounted for longitudinal and rocking movements, an arm for each of said yokes rigidly secured to said spindle and selectively engageable with the respective yokes, and means for moving said spindle longitudinally to selectively engage said arms with their respective yokes and for rocking the spindle and arm to shift the yoke selected.

13. A speed changing mechanism, a pair of rods, a pair of shifting devices mounted for sliding movements along said rods, other rods supported parallel with said first rods and engaging and holding said shifting device from turning on said first rods, a spindle mounted for longitudinal and rocking movements, a pair of arms rigidly secured to said spindle and selectively engageable with the respective shifting devices, and means for actuating said spindle to move an arm into engagement with its respective shifting device and to shift the device selected.

ELMER G. KESLING.